*Rowell & Belknap.*
*Watch-Maker's Lathe.*
N° 92,545.    Patented Jul. 13, 1869.
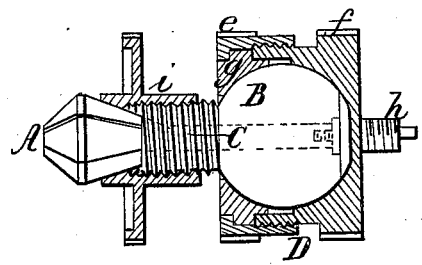
Witnesses;
A. Bennewendorf
J. C. Hinchman
Inventors;
C. C. Rowell
J. Belknap
per Munn & Co.

United States Patent Office.

C. C. ROWELL AND JOHN BELKNAP, OF ST. JOHNSBURY, VERMONT.

Letters Patent No. 92,545, dated July 13, 1869.

IMPROVED WATCH-MAKERS' LATHE.

The Schedule referred to in these Letters Patent and making part of the same.

*To all whom it may concern:*

Be it known that we, C. C. ROWELL and JOHN BELKNAP, of St. Johnsbury, in the county of Caledonia, and State of Vermont, have invented a new and useful Improvement in Watch-Makers' Chucks; and we do hereby declare that the following is a full, clear, and exact description thereof, which will enable others skilled in the art to make and use the same, reference being had to the accompanying drawing, forming part of this specification.

This invention relates to a new and useful improvement in chucks for use, by watch-makers and others, in centring and turning small articles connected with their work; and It consists in arranging a fastening-jaw in combination with a ball-and-socket joint, all constructed and operating as hereinafter described.

The accompanying drawing represents a vertical section of the chuck.

A is the jaw.
B is the ball.
C is the neck of the ball.
D is the socket, which encloses the ball, and is formed of three parts, $e$, $f$, and $g$.

The parts $e$ and $f$ screw together, holding the part $g$ in contact with the ball, as seen in the drawing.

The shank of the jaw A passes in through the neck C and the ball, as seen in dotted lines.

$h$ is the stem, attached to the part $f$ of the socket, which secures the chuck to the face-plate or spindle of the lathe.

The jaw A is trisected from a fine central hole to the periphery. The back portion is conical, and the sections are forced toward each other by means of the finger-nut $i$, which works with a screw-thread on the neck C, and in contact with the conical back part of the jaw, as is common in chucks for light work.

In practical operation, the piece to be turned is first secured, at one end, in the jaw A, by means of the nut $i$, and its opposite end adjusted upon a fixed point. The same may then be centred in the usual or any preferable manner, and the ball B tightened, to hold it in the desired position, by turning the nuts $e f$.

Having thus described our invention,

We claim as new, and desire to secure by Letters Patent—

The combination of the nut $i$ and jaw A with a ball-and-socket joint, substantially as and for the purposes herein shown and described.

C. C. ROWELL.
JOHN BELKNAP.

Witnesses:
THERON M. HOWARD,
H. B. DAVIS.